United States Patent [19]
Stumpf et al.

[11] Patent Number: 5,222,219
[45] Date of Patent: Jun. 22, 1993

[54] PIPELINE COMPUTER SYSTEM HAVING WRITE ORDER PRESERVATION

[75] Inventors: Bernard Stumpf, Chelmsford; Mark Kline, North Andover, both of Mass.; Jeffrey D. Kurtze, Nashua, N.H.; Richard G. Bahr, Cambridge, Mass.

[73] Assignee: Hewlett-Packard Company, Palo Alto, Calif.

[21] Appl. No.: 574,389

[22] Filed: Aug. 27, 1990

Related U.S. Application Data

[63] Continuation of Ser. No. 262,536, Oct. 25, 1988, abandoned.

[51] Int. Cl.$^5$ .................. G06F 13/00; G06F 13/36; G06F 13/42
[52] U.S. Cl. .................. 395/325; 364/240.9; 364/271; 364/935.4; 364/940.2; 364/940.81; 395/575
[58] Field of Search .................. 395/375, 325, 575

[56] References Cited

U.S. PATENT DOCUMENTS

| | | | |
|---|---|---|---|
| 4,419,724 | 12/1983 | Branigin et al. | 364/200 |
| 4,547,849 | 10/1985 | Louie et al. | 364/200 |
| 4,587,609 | 5/1986 | Boundreau et al. | 364/200 |
| 4,768,145 | 8/1988 | Wheelwright | 395/325 |

FOREIGN PATENT DOCUMENTS

| | | |
|---|---|---|
| 30165603 | 12/1985 | European Pat. Off. |
| 30218426 | 4/1987 | European Pat. Off. |

Primary Examiner—Thomas C. Lee
Assistant Examiner—Meng-Ai T. An

[57] ABSTRACT

A method for preserving data transfer order in a pipeline computer system, wherein a first block of data is transferred from a first device to at least a second device during a first computer cycle. Simultaneously, the first block of data is stored within the first device. Druing a second computer cycle, a second block of data is transferred from the first device to the second device, and an acknowledge signal is issued, indicating the success or failure of the transfer of the first block of data. If the acknowledge signal indicates a failed data transfer, a reject signal is issued and data transfer is restarted beginning with the previously failed data transaction which has been stored within the first device, and data transfer then continues with a preserved data transfer order.

12 Claims, 2 Drawing Sheets

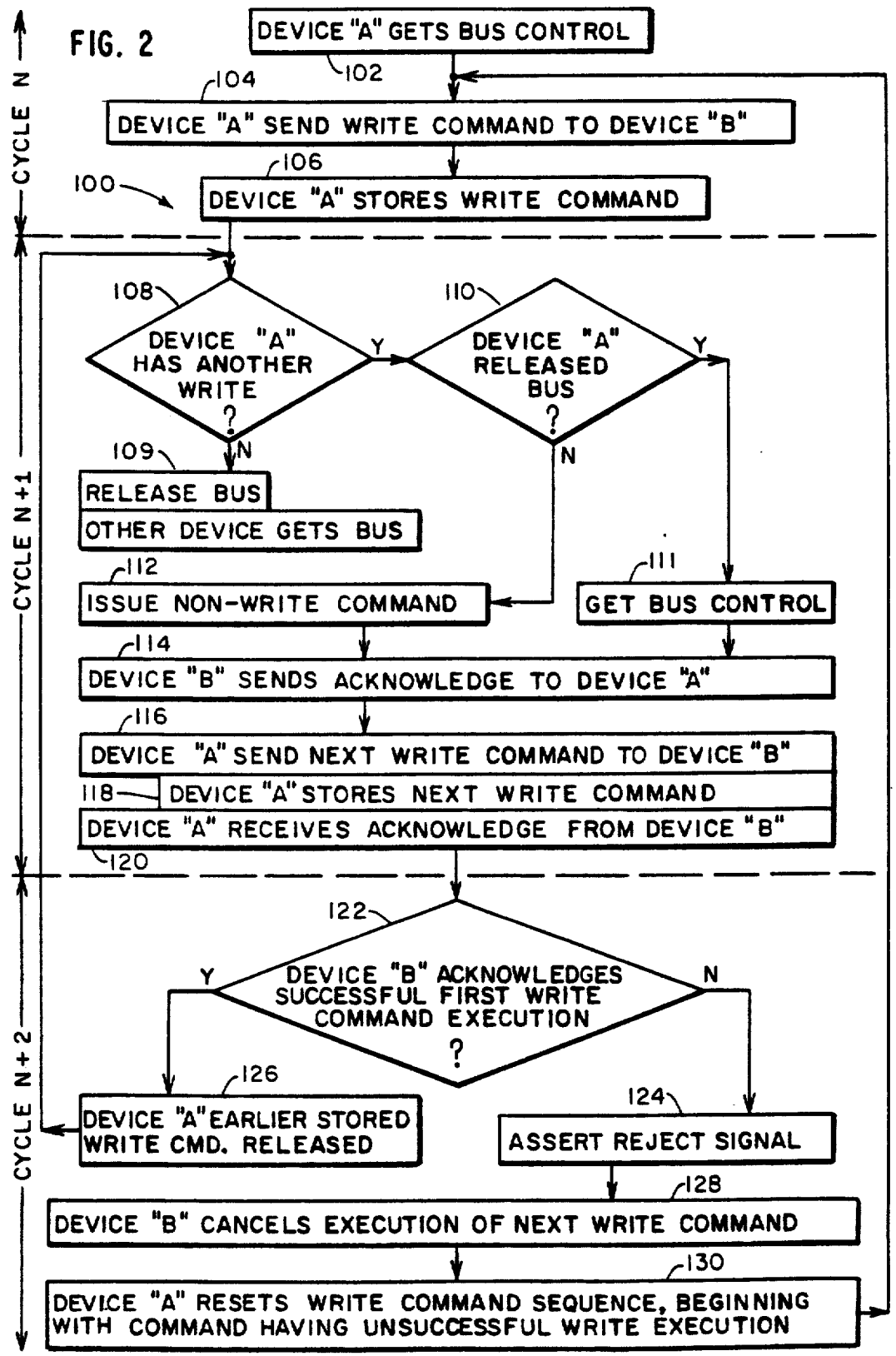

PIPELINE COMPUTER SYSTEM HAVING WRITE ORDER PRESERVATION

This application is a continuation of application Ser. No. 07/262,536, filed Oct. 25, 1988, now abandoned.

FIELD OF THE INVENTION

The present invention relates to pipeline computer systems and, in particular, interruptible pipeline processors having selected interrupt instruction control

BACKGROUND OF THE INVENTION

The bus protocol in high-performance, highly pipelined bus architecture may allow for a high degree of overlapped activity. For instance, arbitration, transfer, decoding and transfer acknowledge may be 4 stages of request handling that may be underway for 4 distinct requests at the same moment. Thus, First-In, First-Out (FIFO) style buffering which will, under certain conditions, fill up, either causing a transaction to wait for the FIFO to become available or send a BUSY response to the requesting device, asking it to try again at a later time. It is not desirable to have a device occupy the bus while waiting for another device to make its buffers available since this makes the bus bandwidth unavailable for other transfers, causing valuable bus bandwidth to be needlessly tied up. This problem becomes more severe in the case of a multiprocessor system sharing a single bus resource, since the bus may become the system bottleneck. Moreover, in certain implementations a slow device on the bus can magnify this problem even further, since the whole system will start to run at the speed of this slow device.

Moreover, if a device is in the process of performing multiple writes across the bus, it must either wait for a previous write to be acknowledged as accepted before sending another write, or it must obey some protocol that will insure that write order is preserved. Waiting for a previous write to be acknowledged before issuing another write is lower performance than sending another write as soon as possible. However, in some pipelined system bus protocols, sending another data write will likely not preserve write order of data, causing processing errors.

Therefore, it is important to preserve write order so that information may be passed in control blocks from process to process, processor to processor, and I/0 system to processors. Control blocks are normally formulated by assembling the information into some predetermined format and then setting some ready flag or setting up some queue pointer. However, if a write to a ready flag manages to occur prior to a write setting up some information in the control block, the receiving process will get a corrupted message.

SUMMARY OF THE INVENTION

The computer system having write order preservation for the bus data transfers according to the present invention requires a minimum of one unused cycle between successive writes by a given device, where "unused" means unused by that particular device for a write operation, and a REJECT signal to indicate to all devices that the command that they just received is invalid.

The protocol, according to the present invention, has been applied to a specific bus architecture; however, the concept is extendible to other architectures. The bus is a synchronous bus that is capable of initiating a read or a write operation in every bus cycle. Bus arbitration may also occur in a single cycle, which may be overlapped with other transfers, so that it is quite possible that a write operation could be initiated in every cycle. Every bus transaction is accompanied by an acknowledgment from the receiving device in the second cycle after the transaction bus cycle. The acknowledgment cycles are completely overlapped with other transactions so they do not affect bus bandwidth.

BRIEF DESCRIPTION OF THE DRAWINGS

These and further features of the present invention will be better understood by reading the following detailed description of the drawings, wherein:

FIG. 2 is a flow-chart of one embodiment of the present invention.

DETAILED DESCRIPTION OF THE INVENTION

Figure 1:
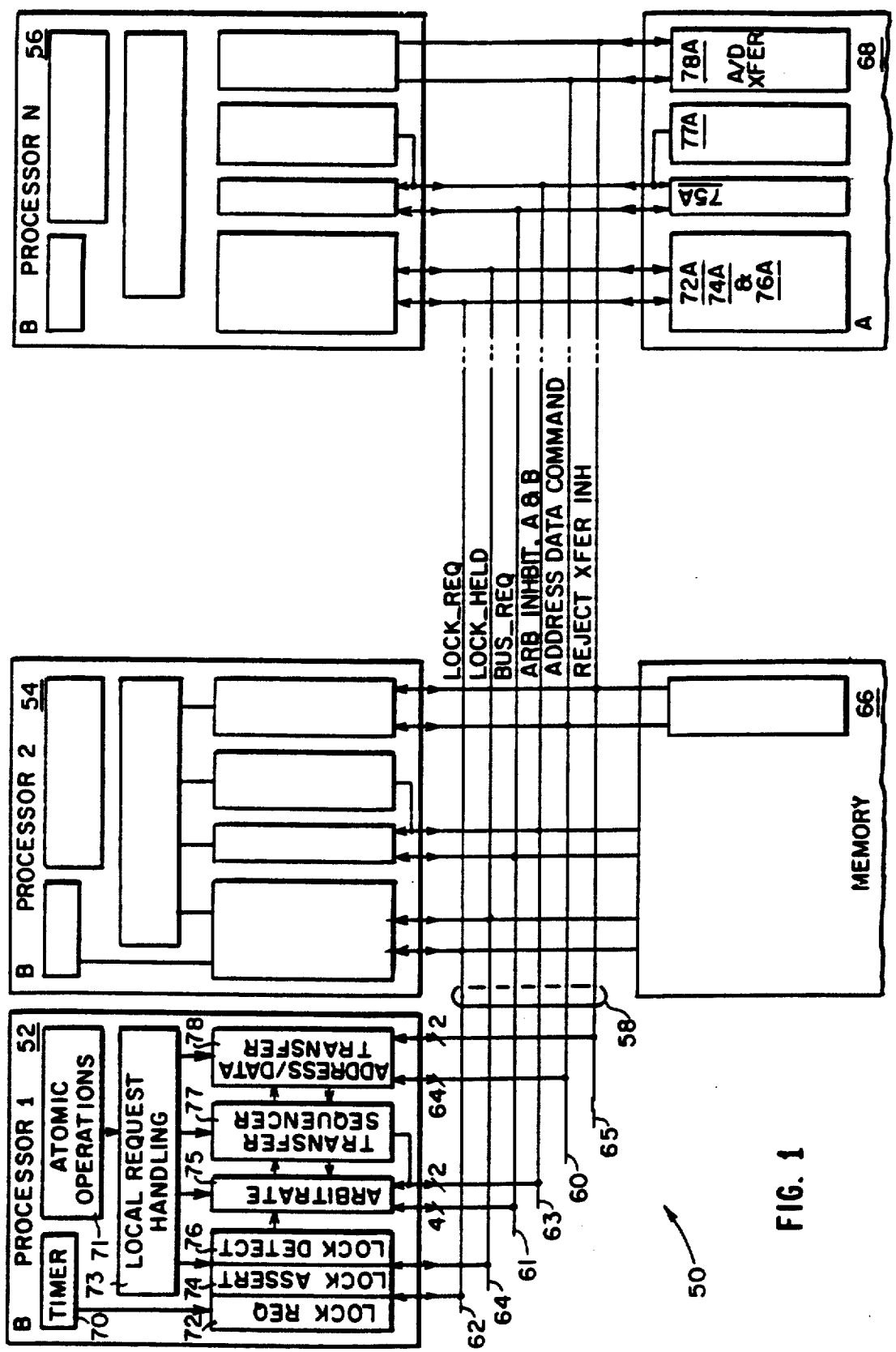
FIG. 1 is a block diagram of one embodiment of a computer system implementation of the present invention.

In relation to the exemplary system block diagram 50 of FIG. 1 (and the flow chart of FIG. 2), the operation of the protocol is as follows. A first device 52 gets the bus 58 (102) and sends a write command to a second device 68 (104), his write operation is stored (106) in a holding register in transfer element 78 until an acknowledgment to the bus transaction is received by the first device 52 on leads 65. If the first device has another write to issue 108, it can hold (110) onto the bus 58 and execute another non-write command for a cycle (112), and then issue the write (116) in the next cycle or release (109) the bus and rerequest (110) the bus, being granted access to the bus in the following cycle at which time it can then issue the write (116) on the conditions discussed in Ser. No. 07/262,475, now abandoned, entitled MULTIPROCESSOR INTERLOCK, and Ser. No. 07/262,574, now U.S. Pat. No. 4,979,099, entitled A QUASI-FAIR BUS ARBITRATION SCHEME WITH DEFAULT OWNER SPEEDUP, both filed concurrently herewith and incorporated herein by reference. If the first device does either of the latter, then it should be receiving (120) an acknowledgment sent from the second device 68 (114) in the same cycle as first device 52 is sending out the second write (116). If the acknowledgment indicates (122) that second device 68 was busy and unable to accept the first write command, first device 52 asserts the REJECT signal (124) on one of leads 65 in the next cycle indicating that the write sent in the previous cycle should be cancelled. This REJECT signal is looked at by all devices (e.g., 54, 56 and 66), not just the second device (68) since write order must be preserved across all of the address space not just within a range of addresses. Upon receiving the REJECT signal, any device that received a command in the previous cycle would cancel that command (128). The sending device must back up (130) and send the first write again (104), followed by the second write (116), essentially starting the processing of its command stream over again, starting with the write that received a busy acknowledgment, thus maintaining the write if the command was successfully executed as indicated (122) with a successful acknowledge order, the earlier stored command is released (126) and the processing of the command stream continues (108).

Furthermore, the present invention, including the use of the REJECT signal, is not limited to the preservation of write order. It can also be used to speed up various bus operations by pushing error detection or correction to a later time. For instance, if a device is returning some read data from an error correcting memory, and there is not enough time to do the error detection or correction prior to putting the data on the bus, then the device may put the data on the bus "as if" it were good and then retract the transmission if necessary by sending REJECT in the subsequent cycle. The protocol, according to the present invention, may offer considerable performance advantages since most transmissions would proceed without the need for the REJECT cycle overhead. The normal system operation would not have to pay a performance penalty to accommodate the infrequent abnormal cycle from bad data. Modifications and/or substitutions made by one of ordinary skill in the art are written within the scope of the present invention which is not to be limited except by the claims which follow.

What is claimed is:

1. A data transfer method with write order preservation for a pipeline computer system having at least first and second devices coupled by a shared communication bus, and capable of performing data transfer operations over a plurality of computer cycles, comprising the steps of:

securing access to the shared communication bus by a first device;

transferring a first set of data from said first device to a second device during a first computer cycle;

storing within said first device, said first set of data;

transferring a second set of data from said first device to said second device druing a third or subsequent computer cycle;

issuing a reject signal during said third or subsequent computer cycle by said first device, to be received by at least said second device, said reject signal indicating that said first set of data is to be ignored;

ignoring by at least said second device of said first set of data transferred during said first computer cycle in response to receipt of said reject signal issued by said first device; and re-transferring from said first device to said second device, said first set of data stored in said first device in response to said first device issuing said reject signal.

2. The method of claim 1, including, after the step of storing the first set of transferred data, the steps of:

releasing access of the bus by said first device after transferring said first set of data; and reaccessing the bus by the first device before transferring said second set of data.

3. The method of claim 1, wherein additional devices are connected to the bus and receive data transferred thereon, further including the step of:

receiving said reject signal by said additional devices, said reject signal indicating that the first set of data transmitted from said first device was incorrect; and ignoring, by said additional devices, of said first set of data transferred during said first computer cycle in response to receipt of said reject signal issued by said first device.

4. The method of claim 1 wherein transferring said first and second sets of data includes transferring device operation commands for controlling an operation to be perrformed by said second device.

5. The method of claim 4 wherein transferring said device operation commands includes transferring write operation commands.

6. The method of claim 1 further including generally simultaneously with the step of transferring said second set of data by said frist device, the step of sending an acknowledge signal from said second device to said first device during said third or subsequent computer cycle.

7. The method of claim 6 wherein said acknowledge signal indicates that the first set of data was not properly received by said second device.

8. The method of claim 7 wherein said reject signal is issued by said first device in response to receipt of said acknowledge signal indicating that the first set of data was not properly received by said second device.

9. The method of claim 1 wherein issuing said reject signal by said first device to be received by at least said second device indicates that said first set of data transmitted from said first device was incorrect.

10. The method of claim 1 further including after the step of transferring a second set of data, the steps of:

not issuing a reject signal during said subsequent computer cycle by said first device, indicating that said first or subsequent set of data is not to be ignored;

transferring a third set of data from said first device to a second device during a given computer cycle;

storing within said first device, said third set of data;

transferring a fourth set of data from said first device to said second device during a computer cycle subsequent to said given computer cycle; and returing to the step of not issuing a reject signal during a subsequent computer cycle indicating said subsequent set of data is not to be ignored.

11. A data transfer method with write order preservation for a pipeline computer system having at least first and second devices coupled by a shared communication bus, and capable of performing data transfer operations over a plurality of computer cycles, comprising the steps of:

securing access to the bus by a first device;

transferring a first set of data from said first device to a second device during a first computer cycle;

storing within said first device, said first set of data until successful transfer of said first set of data to said second device is adknowledged by said second device;

transferring a second set of data from said first device to said second device during a third computer cycle;

sending an acknowledge signal by said second device to said .first device during said third computer cycle indicating that said first set of data was not properly received by said second device;

issuing a reject signal by said first device to be received by at least said second device in response to said acknowledge signal, indicating said first set of data was not properly received;

ignoring by at least said second device, of said first set of data transferred during said first computer cycle, in response to receipt of said reject signal issued by said first device; and re-transferring from said first device to said second device in a computer cycle subsequent to said third cycle, said first set of data stored in said first device in response to said first device issuing said reject signal.

12. A data transfer method with write order preservation for a pipeline computer system having at least first and second devices coupled by a shared communication bus, and capable of performing data write operations over a plurality of computer cycles, comprising the steps of:

securing access to the bus by a first device;

transferring a first write command from said first device to a second device during a first computer cycle;

storing within said first device, said previously transferred write command;

transferring a second write command from said first device to said second device during a third or subsequent computer cycle;

sending an acknowledge signal by said second device to said first device during said third or subsequent computer cycle, indicating that said first write command was not properly received by said second device;

issuing a reject signal during said third or subsequent computer cycle by said first device, to be received by said second device, indicating that the write command transmitted from said first device during a first computer cycle was not properly received;

ignoring by at least said second device, of said first write command transferred during said first computer cycle, in response to receipt of said reject signal issued by said first device; and re-transferring said first write command stored in said first device from said first device to said second device, in response to said first device issuing said reject signal.

* * * * *